(12) United States Patent
Judd et al.

(10) Patent No.: US 7,076,476 B2
(45) Date of Patent: Jul. 11, 2006

(54) METHOD AND SYSTEM FOR INTEGRATED SERVICE ADMINISTRATION VIA A DIRECTORY SERVICE

(75) Inventors: Steven G. Judd, Redmond, WA (US); Andy Harjanto, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 231 days.

(21) Appl. No.: 09/260,703

(22) Filed: Mar. 2, 1999

(65) Prior Publication Data

US 2002/0194171 A1    Dec. 19, 2002

(51) Int. Cl.
*G06F 17/30* (2006.01)

(52) U.S. Cl. .................... 707/1; 707/4; 707/10

(58) Field of Classification Search .............. 707/1–10, 707/102, 103, 104, 201, 100–104.1; 709/203, 709/227, 221–225, 226
See application file for complete search history.

(56) References Cited

U.S. PATENT DOCUMENTS

| | | | | |
|---|---|---|---|---|
| 5,689,700 A | * | 11/1997 | Miller et al. .................... 707/10 |
| 5,692,129 A | * | 11/1997 | Sonderegger et al. ......... 707/10 |
| 5,761,380 A | * | 6/1998 | Lewis et al. .................... 706/45 |
| 5,761,499 A | * | 6/1998 | Sonderegger ................ 707/10 |
| 5,784,612 A | * | 7/1998 | Crane et al. .................... 713/10 |
| 5,787,442 A | * | 7/1998 | Hacherl et al. ............. 707/201 |
| 5,819,030 A | * | 10/1998 | Chen et al. .................. 707/205 |
| 5,857,190 A | * | 1/1999 | Brown ........................ 707/10 |
| 5,893,107 A | * | 4/1999 | Chan et al. .................. 707/103 |
| 5,907,837 A | * | 5/1999 | Ferrel et al. .................... 707/3 |
| 5,933,599 A | * | 8/1999 | Nolan ........................ 715/734 |
| 5,941,947 A | * | 8/1999 | Brown et al. ................ 709/225 |
| 5,960,439 A | * | 9/1999 | Hamner et al. ............. 707/102 |
| 5,987,471 A | * | 11/1999 | Bodine et al. ............... 707/103 |
| 6,014,686 A | * | 1/2000 | Elnozahy et al. ........... 709/202 |
| 6,016,499 A | * | 1/2000 | Ferguson ..................... 707/104 |
| 6,047,322 A | * | 4/2000 | Vaid et al. ................... 709/224 |
| 6,052,724 A | * | 4/2000 | Willie et al. ................. 709/223 |
| 6,058,426 A | * | 5/2000 | Godwin et al. ............. 709/229 |
| 6,061,692 A | * | 5/2000 | Thomas et al. ............. 707/200 |
| 6,061,726 A | * | 5/2000 | Cook et al. .................. 709/226 |
| 6,065,017 A | * | 5/2000 | Barker ........................ 707/202 |
| 6,067,568 A | * | 5/2000 | Li et al. ....................... 709/223 |

(Continued)

FOREIGN PATENT DOCUMENTS

WO    WO 98 22893    5/1998

OTHER PUBLICATIONS

Magnus Harlander: "Central Systems Administration in a Heterogeneous Unix Environment: GeNUAmin" Internet Document: Proceedings of the Eighth Usenix System Administration Conference (Lisa VIII) Sep. 19-23, 1994, XP002145383 San Diego, USA.

(Continued)

*Primary Examiner*—Jean M. Corrielus
*Assistant Examiner*—Anh Ly
(74) *Attorney, Agent, or Firm*—Workman Nydegger

(57) ABSTRACT

A system and method of network administration uniformly exposes the administrative interfaces of network services to facilitate network administration. Each service has published, in a network directory service, an object comprising information relevant to the service. An administrative tool is able to harvest information from the object and use it to automatically invoke a service-specific tool. The service-specific tool is able to locate and communicate with the service by using information passed to the service-specific tool from the administrative tool.

15 Claims, 10 Drawing Sheets

U.S. PATENT DOCUMENTS

| | | | | |
|---|---|---|---|---|
| 6,076,106 | A | * | 6/2000 | Hamner et al. ............. 709/223 |
| 6,085,030 | A | * | 7/2000 | Whitehead et al. ......... 709/203 |
| 6,105,069 | A | * | 8/2000 | Franklin et al. ............ 709/229 |
| 6,212,558 | B1 | * | 4/2001 | Antur et al. ................ 709/221 |
| 6,219,700 | B1 | * | 4/2001 | Chang et al. ............... 709/222 |
| 6,220,768 | B1 | * | 4/2001 | Barroux ...................... 709/224 |
| 6,243,712 | B1 | * | 6/2001 | Lennert et al. ................. 707/3 |
| 6,256,031 | B1 | * | 7/2001 | Meijer et al. ............... 345/854 |
| 6,317,788 | B1 | * | 11/2001 | Richardson ................. 709/224 |
| 6,360,230 | B1 | * | 3/2002 | Chan et al. ................. 707/103 |
| 6,377,960 | B1 | * | 4/2002 | Qiu et al. ................... 707/203 |
| 6,385,615 | B1 | * | 5/2002 | Haeri et al. ................... 707/10 |
| 6,421,682 | B1 | * | 7/2002 | Craig et al. ............. 707/103 R |
| 6,502,131 | B1 | * | 12/2002 | Vaid et al. .................. 709/224 |
| 6,816,903 | B1 | * | 11/2004 | Rakoshitz et al. .......... 709/226 |
| 2001/0047421 | A1 | * | 11/2001 | Sridhar et al. .............. 709/230 |
| 2003/0093479 | A1 | * | 5/2003 | Mellen-Garnett et al. ... 709/205 |

OTHER PUBLICATIONS

*LDAP-Support@UMICH.edu*: "Chapter 3: The Big Picture-Configyration Choices" Internet Document: The SLAPD and SLURPD Administrators Guide, Release 3.3, Apr. 30, 1996, XP002145384 University of Michigan, USA.

Carole Williams (Carole@Redhat.com): "General technical introduction to Linuxconf" Internet Document, Online! Dec. 30, 1997, pages tech.html, tech1.html-tech13.html, XP002145385 Retrieved from the Internet: URL:http://www.solucorp.qc.ca/linuxconf/tech/tech-intro/> retrieved on Aug. 18, 2000.

Gledson Elias Da Silveira, Fabio Q. B. Da Silva: "A Configuration Distribution System for Heterogenous Networks" Internet Document: Proceedings of the twelfth USENIX systems administration conference (Lisa '98), Online! Dec. 6-11, 1998, pp. 109-120, XP002145382 Boston, USA.Retrieve from the Internet: URL:http://www.usenix.org/publications/library/proceedings/lisa98/full_papers/silveira/silveira.pdf retrieved on Aug. 17, 2000, p. 109.

Microsoft Corporation. *Active Directory Programmer's Guide*. (Jan. 22, 1999).

Rosenberry et al. *Understanding DCE*. O'Reilly and Associates, Inc. (1993).

Shirley et al. *Guide to Writing DCE Applications*. O'Reilly and Associates, Inc. (1994).

* cited by examiner

208

METHOD AND SYSTEM FOR INTEGRATED SERVICE ADMINISTRATION VIA A DIRECTORY SERVICE

TECHNICAL FIELD

This invention relates generally to computer networks and, more particularly, relates to an administration tool which allows a network administrator using a computer to administer a service instance residing on a remote computer.

BACKGROUND OF THE INVENTION

A network or system of computers often has instances of services dispersed on machines throughout the network. It is frequently desirable for the administrator of the network or system to be able to administer a particular service instance. For example, an administrator may need to modify or configure a particular DNS server, SQL Server, or Exchange Server.

Traditionally, in order for an administrator to locate and modify such service instances, it has been necessary for the administrator to have prior knowledge of the location of the particular service instance (or access to a service-specific directory of some sort) and knowledge of the particular tool or tools usable to modify the service instance.

There currently exist in certain contexts schemes for publishing the identification and location of network services via a directory. For example, in a particular distributed computing environment (DCE) utilizing Remote Procedure Call (RPC), there may exist a mechanism for publishing RPC servers in a directory. Also, the Novell Directory Service (NDS) has infrastructure for publishing network services in a directory. However, current tools which take advantage of these directories still require that the administrator, having used the directory to locate the service of interest, connect to the computer hosting the service and locate and invoke a tool usable to manage the service.

It can be readily appreciated that existing methods of network management do not allow an administrator to interact in an apparently direct manner with a service of interest, but rather force the administrator to interact with the service via the host computer and service-specific administrative tools. Accordingly, a method and system of network service administration is needed whereby a network administrator may administer a service of interest without prior knowledge of the location of the machine hosting the service or of the identification and mode of usage of the service-specific tools usable to administer the service.

SUMMARY OF THE INVENTION

In accordance with this need, the present invention is generally realized in a method and system of network service administration for uniformly exposing the administrative interfaces of services in a computer network and for automatically invoking the user interface of a service of interest. In performance of the method, a service object representative of and containing information relating to the service of interest is published to a directory service. In this manner an administrator, using a management program, may query the directory service for services of interest and, in response to this query, receive a result list of services matching the search criteria. The administrator may thereafter select a service to manage, at which time the service-specific tool usable to administer the service of interest is invoked without user input, and may present a service-specific user interface. The management program may invoke a program or module to allow the passage of information contained in the service object from the management program to the service-specific tool. The information passed allows the service-specific tool to locate and bind to the service instance. As a result, the administrator only needs to be aware of limited information such as the name or nature of the service in order to manage a service instance.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
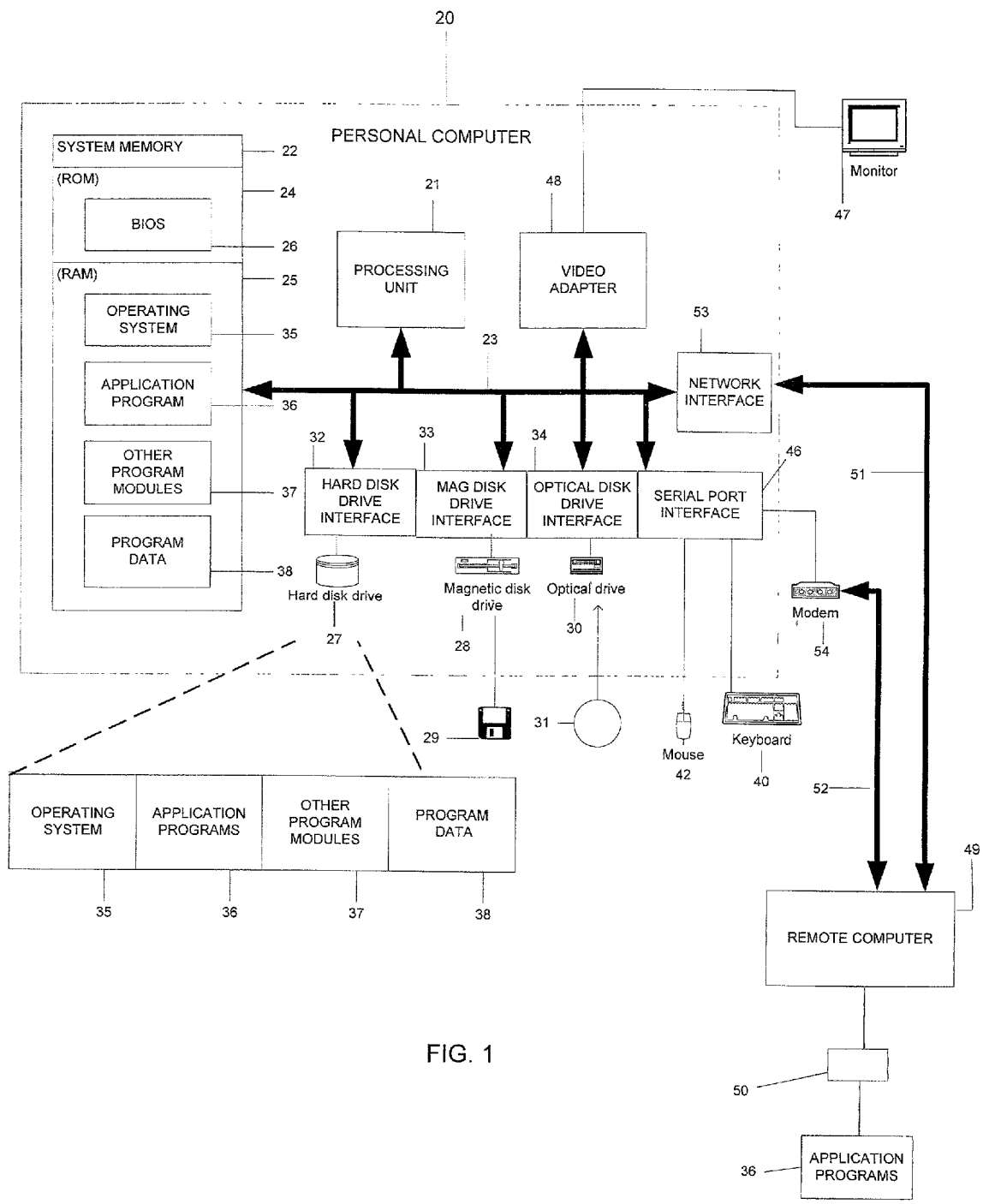
FIG. 1 is a block diagram generally illustrating an exemplary computer system usable as part of an implementation of the invention.

Turning to the drawings, wherein like reference numerals refer to like elements, the invention is illustrated as being implemented in a suitable computing environment.

Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. Steps or elements of the invention discussed as occurring or being located upon one computer may also be practiced in distributed computing environments where tasks are performed by remote processing devices that are linked through a communications network. In a distributed computing environment, program modules may be located in both local and remote memory storage devices.

With reference to FIG. 1, part of an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

A personal computer 20 used to implement the present invention will operate in a networked environment using logical connections to one or more remote machines, such as remote computer 49. The remote machine 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. Program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware. Furthermore, it is understood that a service may be duplicated in a network, and therefore the term "service" also includes instances of services which are installed at more than one location in the network.

Figure 2:
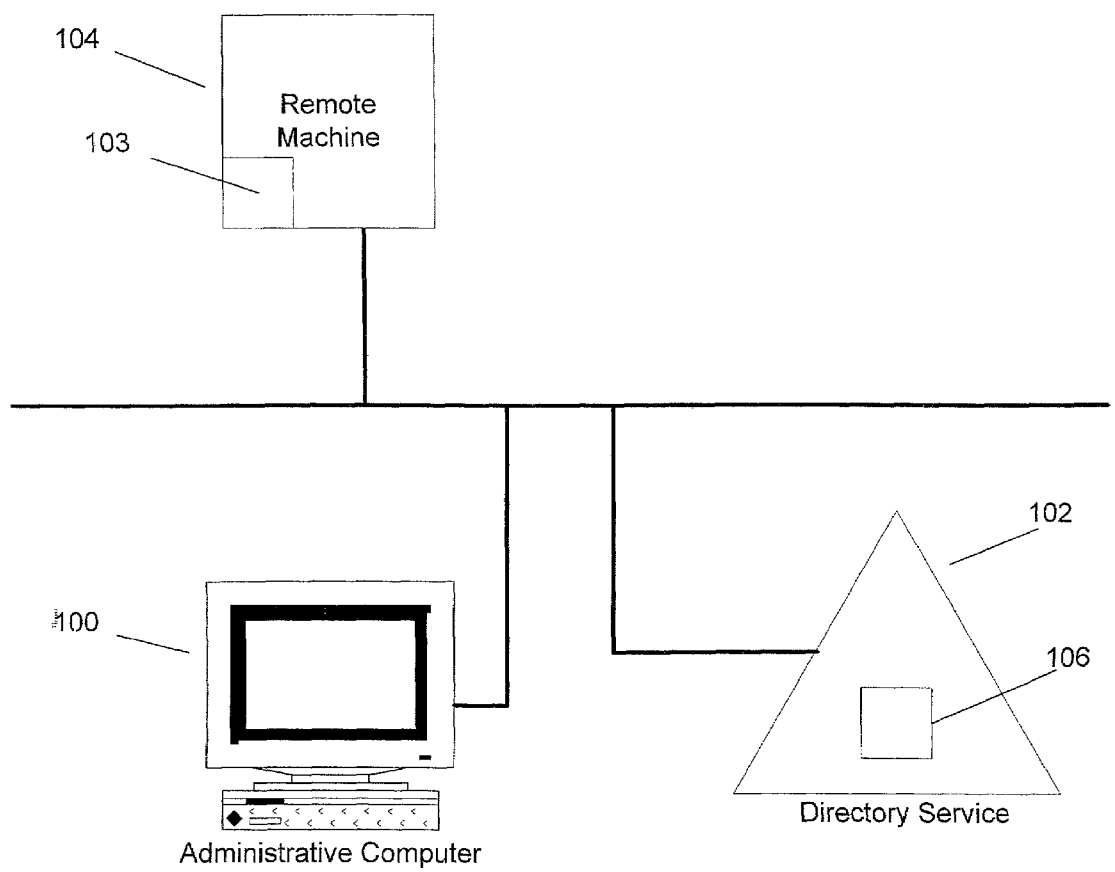
FIG. 2 is a simplified schematic of a network environment in which the invention may be implemented.

The invention is implemented in a network or system of computers as shown in FIG. 2. As illustrated, at least one computer 100 connectable to the network is provided as an administrative computer usable at least in part to administer some network services. The administrative computer 100 has installed on it a management program which provides or supports management functionality. As described in greater detail hereafter, this management functionality includes the ability to query a directory service 102 for services 103, the ability to allow the selection of a service from a list of services returned by the directory service 102, and the ability to invoke a service-specific administrative tool usable to manage the selected service. The concept of service management or administration is used broadly herein to include setting and/or monitoring parameters of the service. For example, stopping or starting a service would be management or administration of the service, as would be setting characteristics of the service, such as security characteristics. The directory service 102 is preferably a database which is optimized for fast and efficient query execution, and which may be distributed.

As further illustrated, one or more services 103 are installed on a network computer 104. At the time of installation or at some later time, a service object 106 corresponding to each of the services 103 is manually or automatically published to the directory service 102. The service object 106 may be represented in the directory service 102 as a child of a parent object corresponding to the host computer 104. The service object class is preferably derived from an existing object class. For example, the "Service-Administration-Point" object class is derived from the abstract class "Service-Connection-Point", and is usable to implement the invention.

Properties of the service object 106 may include those of the "Service-Administration-Point" object as listed in Table 1.

TABLE 1

| | | |
|---|---|---|
| Common-Name | String | Relative Distinguished Name (RDN) of the object. Must be unique within the parent container. Typically the service name as registered via "CreateService". |
| Service-Class-Name | String | A string name identifying the service class. Service class names should be in the form <Vendor-name>"-"<Service-Class-Name>. For example: Microsoft-SQL-Server Microsoft-SNA-Server Microsoft-DHCP-Server Microsoft-DNS-Server and so on. |
| Service-Admin-CLSID | String | String GUID: Class Identifier (CLSID) of the service-specific admin snap-in for this service. |
| Service-DNS-Name | String | Inherited from Service-Connection-Point. The name of this service as published in the Domain Name Service. |
| Service-DNS-Name-Type | String | Inherited from Service-Connection-Point. The record type used to publish this service in the Domain Name Service. |
| Service-Binding-Information | String | Inherited from Service-Connection-Point. String containing service-specific binding information for this service. The format and content of this string is specific to the service in question. For example, it could be an RPC String Binding, a dotted DNS name, etc. |
| Description | String | Inherited from Service-Connection-Point. Description text. |
| Keywords | Multi-valued String | Inherited from Service-Connection-Point. One or more keywords to assist in locating services of interest. For example "Test", "Production", etc. |

Within the "Service-Administration-Point" object, the Common-Name property corresponds to the Relative Distinguished Name, which does not provide a path to a service, and may not be unique over the network, but which is unique within the parent computer. The Service-Class-Name property identifies what kind of service an object represents, perhaps by vendor name and class of service. The property Service-Admin-CLSID provides the Class Identifier of a service-specific administrative tool usable to administer a service corresponding to the object. This service-specific tool may be a Component Object Model (COM) object usable to administer services of this class. If a service is published on the Internet, properties such as the Service-DNS-Name and Service-DNS-Name-Type properties can be used to provide the published name and resource record type. The Service-Binding-Information property provides information which allows a service-specific administrative tool, once invoked, to locate and bind to a service. This information is opaque in that a service itself and the service-specific administrative tool preferably are able to understand the format and content of the binding information, but the administrator and the management program do not need to look at or understand the binding information. The binding information may comprise for example the globally unique identifier (GUID) of a service. The Description property may be used to provide text describing a service represented by a service object, and a Keyword property may provide words usable to assist in searching for services of interest. These properties may be filled automatically upon service installation, or may be filled or supplemented by the individual running the installation.

Figure 3:
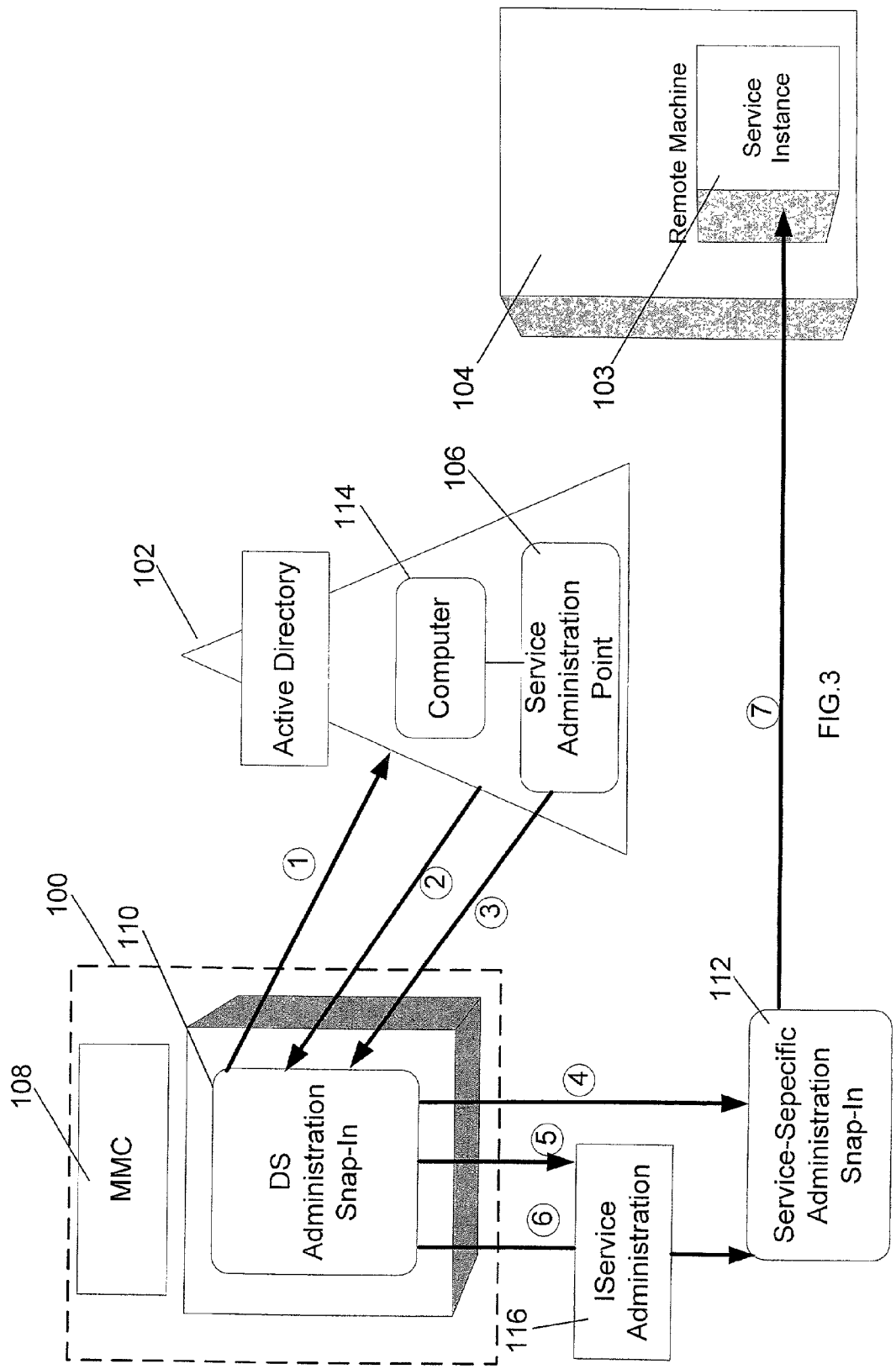
FIG. 3 is a diagram further illustrating the components and communication flow in the network environment of FIG. 2.

Turning to FIG. 3, the components and communication flow are shown. As illustrated, the management program executing on the administrative computer 100 is preferably composed of an extensible management console framework 108, such as Microsoft Management Console, and a generalized administrative module 110 such as the Microsoft Directory Service Administration Snap-In. The Management Console 108 does not provide any management functionality in and of itself. Rather, it acts as a host for one or more modules, each of which provides some quantum of management behavior. The modules may be COM objects that execute in the process context of the Management Console 108, and may be capable of calling on other supporting controls and dynamic link libraries, as well as other similar modules. For example, the Directory Service Administration Snap-In 110 will preferably be capable of invoking a Service-Specific Snap-In 112 in order to manage a particular service.

For more information regarding Snap-Ins, refer to the following white papers published by Microsoft that are hereby incorporated by reference in their entirety: *Microsoft Management Console: Overview*, available at http://premium.microsoft.com/msdn/library/conf/pdc97/ mmc_overview.htm; *Microsoft Management Console: Snap-In User Interface Guidelines*, available at http:// www.microsoft.com/ntserver/windowsnt5/deployment/ planguide/mmc_guide.asp; *Snap-In Design and the Windows NT 5.0 Administration Model*, available at http:// www.microsoft.com/ntserver/windowsnt5/techdetails/ prodarch/ snap_in.asp. Also incorporated herein in its entirety by reference is U.S. application Ser. No. 09/157, 741 entitled "Method And System For Extending Functionality Of A Management Console", filed Sep. 21, 1998.

Furthermore, in this embodiment, the directory service 102 is preferably a directory service such as the Microsoft Active Directory. For more information regarding the Active Directory, refer to the *Active Directory Technical Summary*, published by Microsoft and available at http://www.microsoft.com/ntserver/windowsnt5/techdetails/prodarch/ ad_techsummary.asp. This publication is incorporated herein by reference in its entirety. Also informative and incorporated herein by reference in its entirety is the *Active Directory Programmer's Guide* available at http://msdn.microsoft.com/developer/windowsnt5/default.htm. For further background regarding directory services, the reader is referred to U.S. application Ser. No. 09/197,405, entitled "System and Method for Maintaining Network System Information", filed Nov. 20, 1998, and U.S. application Ser. No. 09/139,090, entitled "Directory Service for a Computer Network", filed Aug. 24, 1998, both of which are herein incorporated by reference in their entirety.

The Directory Service Administration Snap-In 110 is capable of querying the Active Directory 102, but is incapable of directly configuring or modifying any service of interest. Thus, in communication 1, the administrator first queries the Active Directory 102 by entering information or taking action within the interface provided by the Directory Service Administration Snap-In 110. Typically, the administrator will enter search criteria describing services of interest. For example, the administrator may query the Active Directory 102 for "Microsoft_SQL_Server".

Once a query is sent to the Active Directory 102, the Active Directory 102 executes the search request and in communication 2 returns to the Directory Service Administration Snap-In 110 a list of search results, to be displayed using the Directory Service Administration Snap-In 110 user interface. In the case of the foregoing example, the returned list would list all SQL Servers having service objects in the Active Directory 102. The exemplary-service object 106 may be a child of a parent object 114 representative of the computer hosting the service.

The administrator may select a service of interest from the list and indicate a decision to manage the service. In communication 3, the Directory Service Administration Snap-In 110 retrieves the service object from the Active Directory 102 and extracts the properties. Using the Service-Admin-CLSID property, the Directory Service Administration Snap-In 110 invokes a Service Specific Snap-In 112 in communication 4, usable to manage the service of interest.

Because the Service-Specific Snap-In 112 may not have the ability to query or communicate with the Active Directory 102, the Directory Service Administration Snap-In 110 preferably is able to pass information to the Service-Specific Snap-In 112. In order to facilitate this transfer, the Directory Service Administration Snap-In 110, once it instantiates the Service Specific Snap-In 112, may invoke an administrative interface 116, as shown in communication 5. The administrative interface 116 is preferably IServiceAdministration which has a single method. The Interface Description Language (IDL) of the interface is:

```
[uuid(IID_IServiceAdministration)]
interface IServiceAdministration : IUnknown
{
HRESULT   InitializeServiceAdministration
          [IN] LPWSTR wszServiceBindingInformation
          );
};
```

The single method of the interface IServiceAdministration 116 may take as input any information which is potentially to be passed to the Service-Specific Snap-In 112. By way of example, inputs to IServiceAdministration 116 might include the Service-Class-Name, Service-DNS-Name, Service-DNS-Name-Type, and Service-Binding-Information strings from the appropriate service object. Or, for example, IServiceAdministration 116 may take as input certain information from the service object which is usable by the Service-Specific Snap-In 112 to bind to the service object and obtain further information regarding the service of interest.

IServiceAdministration 116 serves two related purposes; it is used to pass information from the Directory Service Administration Snap-In 110 to the Service Specific Snap-In 112, and it is also used by the Directory Service Administration Snap-In 110 to determine whether a particular service is manageable. A consequence of the first function is that the Service Specific Snap-In 112 may obtain from the Directory Service Administration Snap-In 110, through IServiceAdministration 116, the information, such as binding information, that is necessary to allow it to manage the service of interest, as depicted in FIG. 3, communication 6. Also, since an object which does not support the interface IServiceAdministration 116 will not be manageable, the Directory Service Administration Snap-In 110 may utilize the QueryInterface functionality of the COM architecture in order to determine whether a service object in the Active Directory 102 supports the interface and consequently represents a manageable service.

After the administrator has selected a management option or entered management information through the user interface provided by the Service Specific Snap-In 112, the Service Specific Snap-In 112 may then locate and bind to the service of interest 103 as shown in communication 7, implementing the desired management actions. As a result, the administrator has accomplished some management function regarding a specific service 103 without being required to know anything about the service other than the general type or description of the service.

Figure 4A:
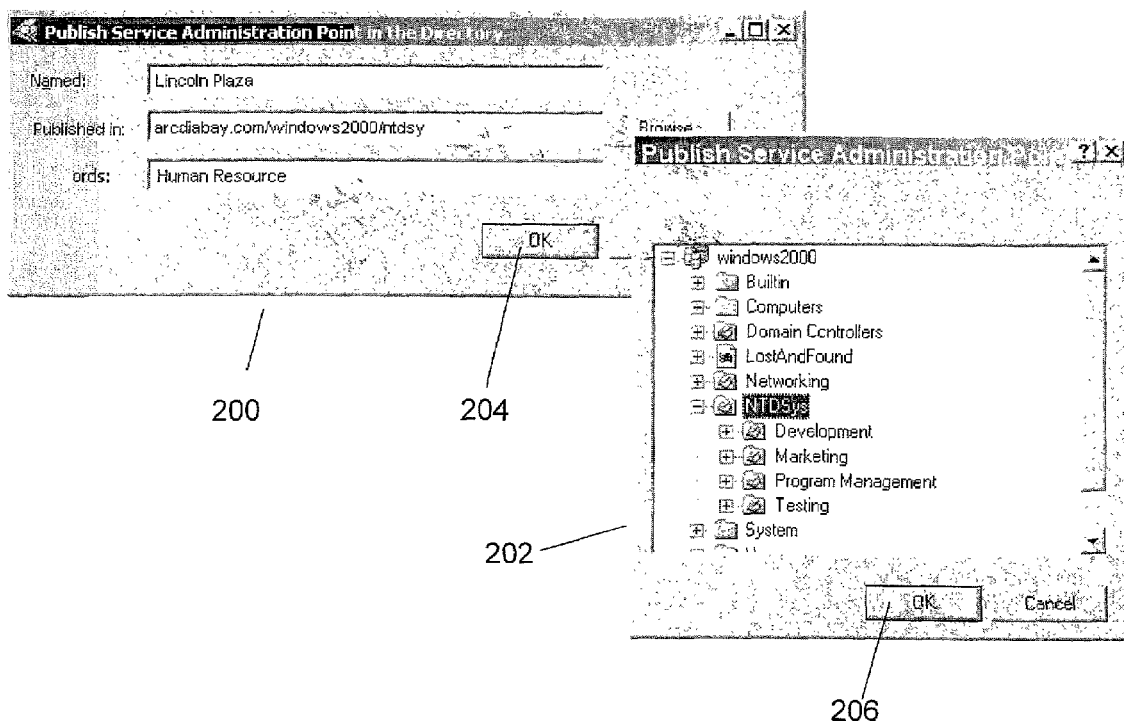
FIG. 4a illustrates exemplary user interface dialog boxes and exemplary user input for publishing a service in accordance with the present invention.

As described above, in order to use the invention, it is preferable that the Service Administration Point 106 of a service of interest is published to the Active Directory in some manner at some time prior to the administrator's attempt to manage the service. As seen in FIG. 4*a*, this may occur at the time of installation of the service of interest on the remote host machine. In the illustration depicted, the service being installed is Microsoft brand SQL Server. The back pane 200 illustrates a possible dialog box presented by the service upon installation for publishing the SQL Server Service Administration Point to an Active Directory 102, as well as possible administrator or installer input in response. The front pane 202, depicting the directory structure where the Service Administration Point is to be published, appears after the administrator or installer has left-clicked the "OK" response option 204 in the back pane. By left-clicking the "OK" response option 206 in this front pane, the administrator or installer will effectuate publication of the SQL Server Service Administration Point object 106 to the appropriate Active Directory 102.

Figure 4B:
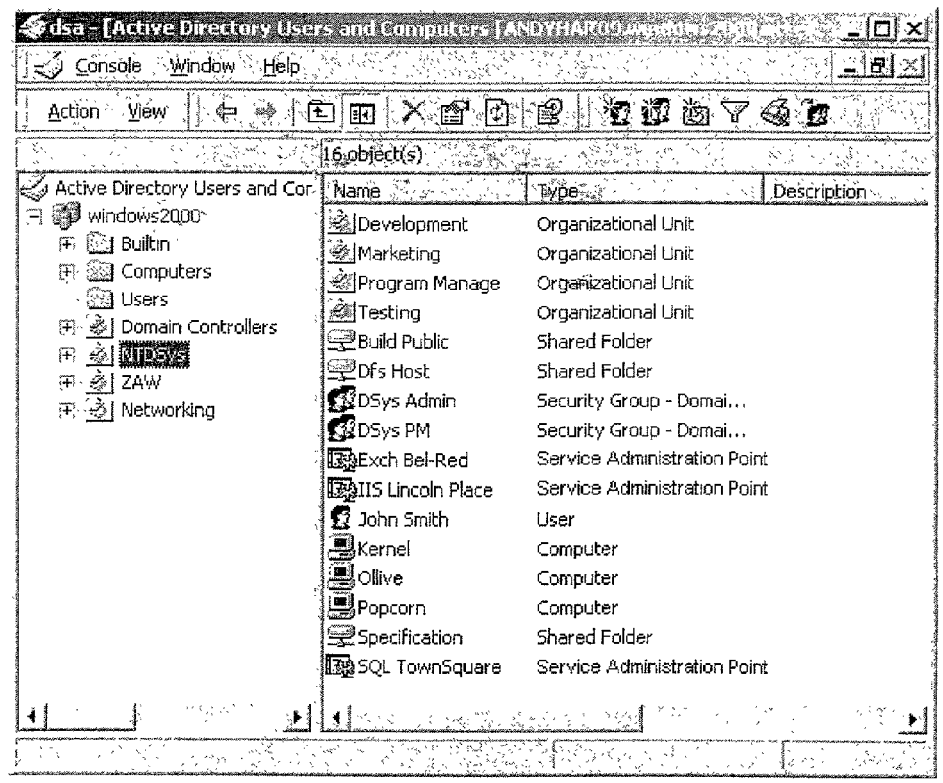
FIG. 4b illustrates an exemplary user interface for viewing directory contents in accordance with the present invention.
Figure 4C:
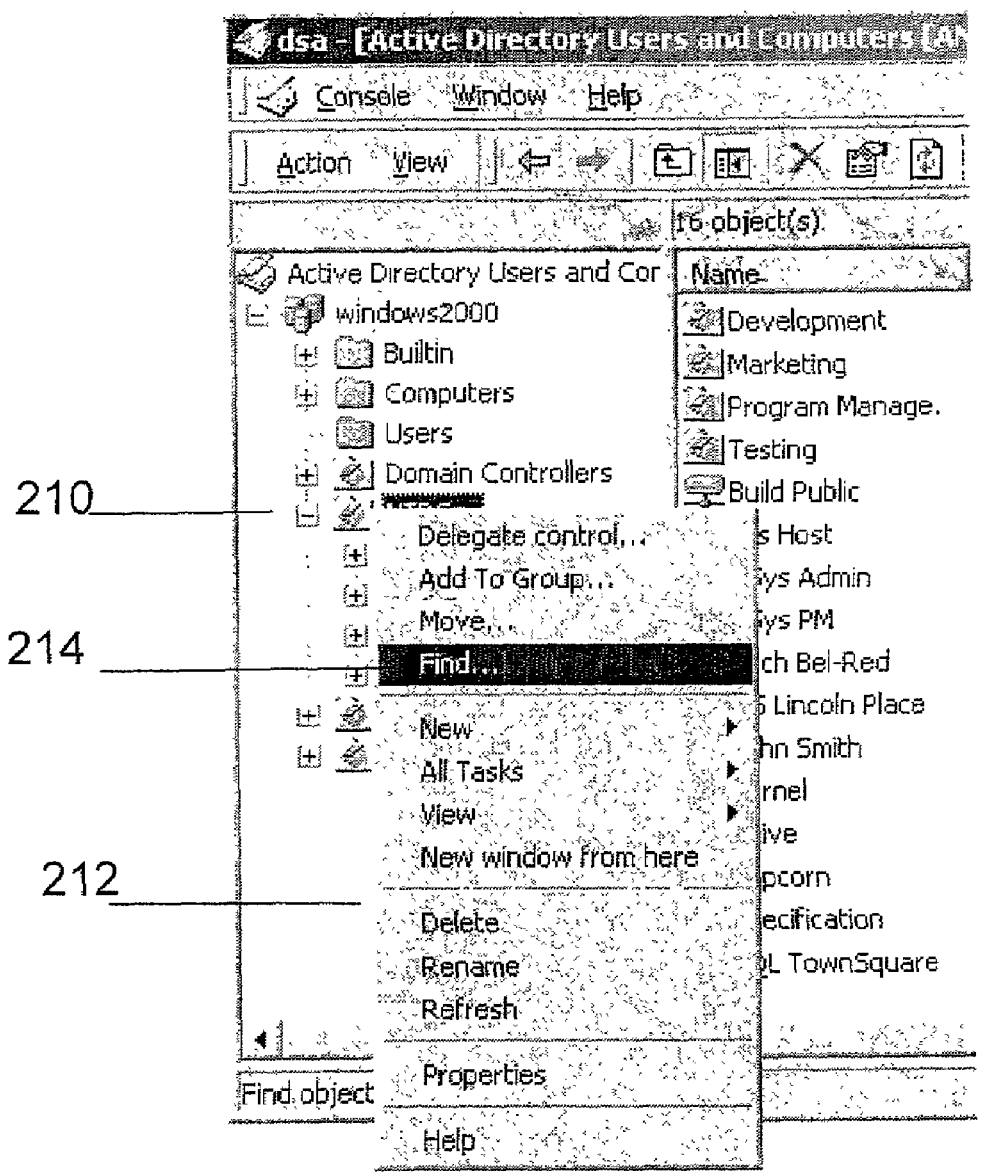
FIG. 4c illustrates an exemplary option list for allowing an administrator to interact with the directory contents depicted in FIG. 4b in accordance with the present invention.
Figure 4D:
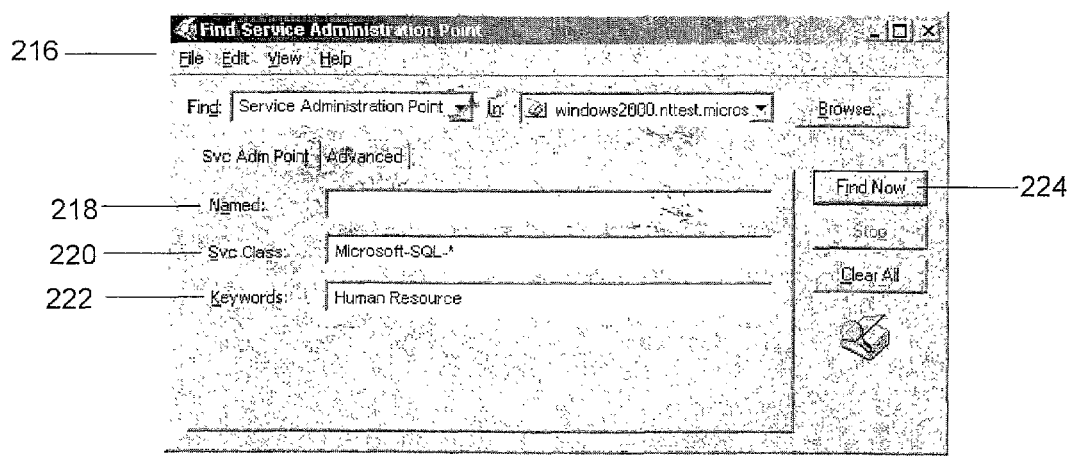
FIG. 4d illustrates an exemplary dialog box for facilitating the finding of a published service of interest in accordance with the present invention.
Figure 4E:
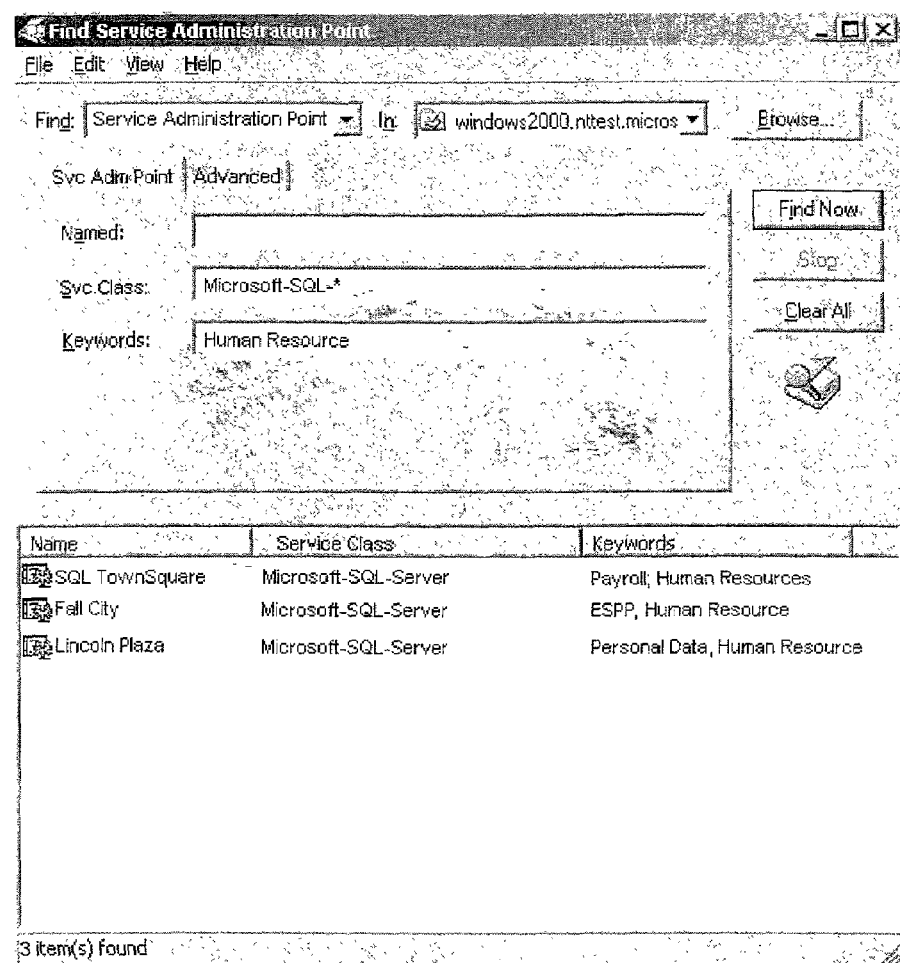
FIG. 4e illustrates an exemplary list of search results created using the dialog box of FIG. 4d in accordance with the present invention.

At some later time when the administrator wishes to manage a service, he or she invokes the Directory Service Administration Snap-In 110 within the Microsoft Management Console 108, causing an interface 208 to be presented to the user, as depicted in FIG. 4*b*. As shown in FIG. 4*c*, after left-clicking on the icon 210 representing the directory system to search, the administrator may right-click to bring up a list of options 212, including "Find" 214. Selecting the "Find" option will cause the system to present a dialog box 216 within which the administrator may enter information useful to find the desired service, as seen in FIG. 4*d*. Search fields might include "Name" 218, "Service Class" 220, and "Keywords" 222. In FIG. 4*d*, it is shown that the administrator has filled in the service class and keywords to search by, but may not know the name property of the service. At this stage, if the administrator left-clicks on the "Find Now" icon 224, the Directory Service Administration Snap-In 110 will query the Active Directory 102 for Service Administration Points satisfying the search criteria, and the Active Directory 102 will execute a search and return to the Directory Service Administration Snap-In 110 a results list of Service Administration Point objects meeting the search criteria. The services in the result list 226 may be exhibited by displaying their properties as shown in FIG. 4*e*.

Figure 4F:
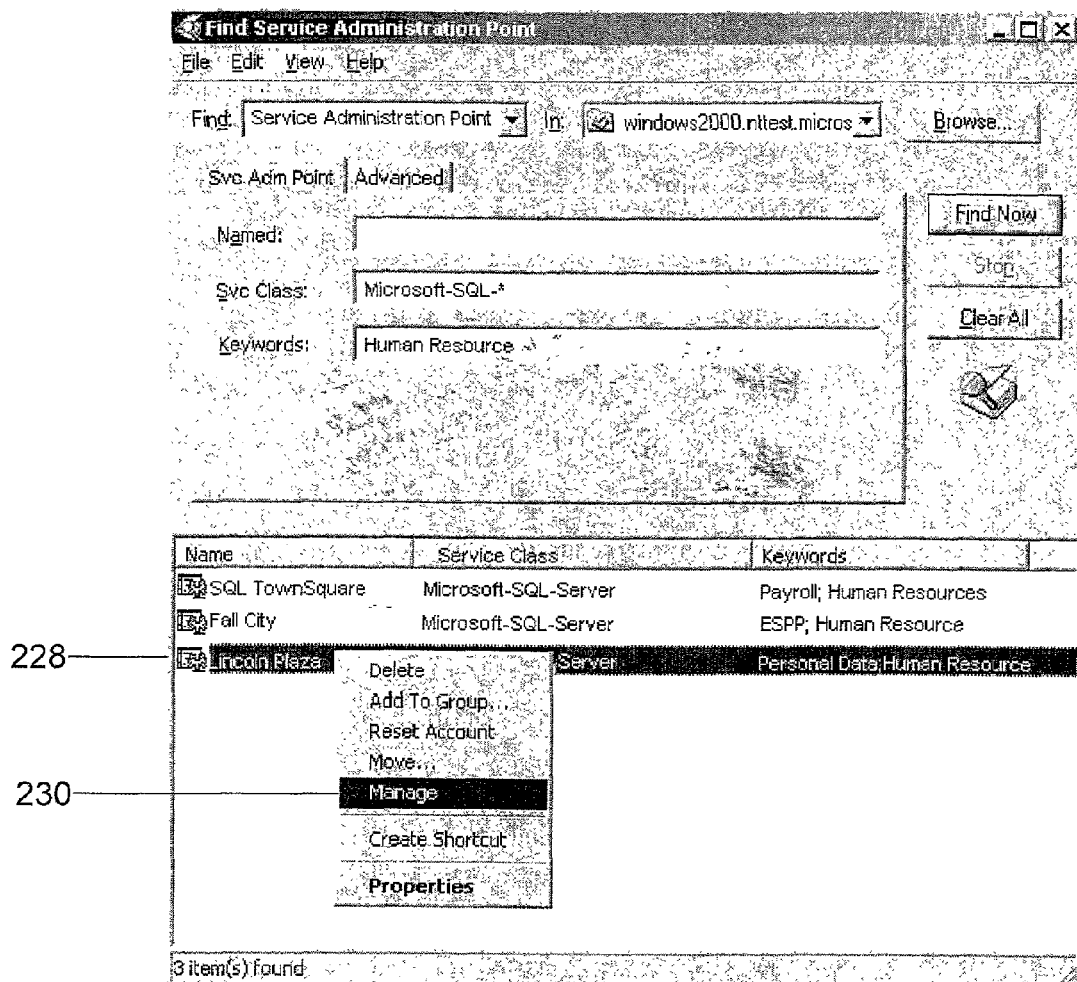
FIG. 4f illustrates an exemplary options list for allowing an administrator to interact with the search result of FIG. 4e in accordance with the present invention.
Figure 4G:
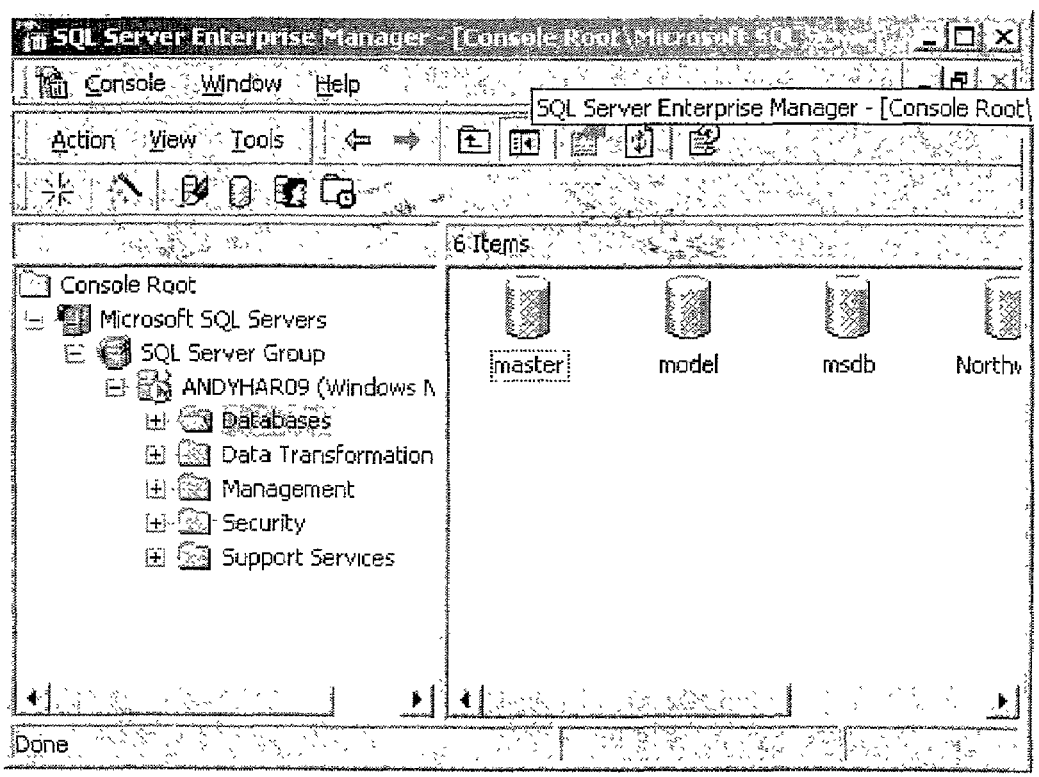
FIG. 4g illustrates an exemplary service-specific interface for allowing an administrator to manage a service selected from the search results of FIG. 4e in accordance with the present invention.

The administrator may now left-click on an entry 228 to select that entry, and may right-click to display a list of options, including "manage" 230 as shown in FIG. 4f. By left-clicking on the "manage" option 230, the administrator initiates several automatic actions: the Directory Service Administration Snap-In 110 will retrieve the Service Administration Point 106 corresponding to the selection, and will extract properties from it; the Directory Service Administration Snap-In 110 will use the Service-Admin-CLSID property to invoke the Service-Specific Snap-In 112 usable to manage the service; the Directory Service Administration Snap-In 110 will invoke the interface IServiceAdministration 116; the Directory Service Administration Snap-In 110 will call the Service-Specific Snap-In 112 at interface 116 and will pass the information contained in the Service Administration Point object 106 property Service-Binding-Information to the Service-Specific Snap-In 112; and the Service-Specific Snap-In 112 will present a user interface to the administrator, as seen in FIG. 4g.

This service-specific interface will now allow the administrator to input information and/or issue commands in order to manage the service 103 in some way. Having received management input; the Service-Specific Snap-In 112 binds to the service 103, in this case the SQL Server named "Lincoln Plaza", to implement the desired management action on that service.

All of the references cited herein, including patents, patent applications, and publications, are incorporated in their entireties by reference.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. As well, it is recognized that programs or program modules described as executing locally may in fact be executed on separate machines. Also, where the term "Snap-In" is employed, one skilled in the art may implement the invention using an object or program which is not a Snap-In, but which serves the same function of extending the functionality of another program, module, object, etc., without departing from the spirit of the invention. Those of skill in the art will recognize that the terms "computer" and "machine" are not intended to limit the invention to the embodiments described, but may include other configurations, including but not limited to hand-held devices, multi-processor systems, microprocessor based or programmable consumer electronics, network PCs, minicomputers, mainframe computers, and the like. Those of skill in the art will also recognize that network connections may be entirely physical connections such as wires, or may include non-physical connections such as radio or optical transmissions. Furthermore, it will be recognized by one of skill in the art that the term "network" refers to a permanently or intermittently connected arrays of computers, including local or wide area networks, whatever their configuration, and including networks which themselves include sub-networks, or networks which are themselves part of a larger network. Thus, for example, a virtual private network may be used to implement the invention. Therefore, the invention as described herein contemplates all such embodiments as may come within the scope of the following claims and equivalents thereof.

We claim:

1. An administrative tool to use in managing a computer network service in a computer network comprising:
    a service object containing information representative of a computing network service, wherein the information identifies the network service by one or more characteristics and is selected from group consisting of the name, type, location, and description of the network service, and information usable to locate a service-specific administrative tool, the information also including a binding information property which is used for identifying at least the location of the network service;
    a directory service in which the object is published;
    a generalized tool for guerving the directory service and for obtaining the information representative of the network service, wherein the generalized tool includes:
        a directory service user interface providing options for querying network services by at least one of a service keyword or a service class upon querying, providing a list of one or more selectable service objects corresponding to one or more network services that are identified during the query and that correspond to the at least one of said service keyword or service class, wherein each of the selectable objects is also associated with information representative of each corresponding service; and
    in response to the user selection selecting one of the service objects from the list, means for launching a service specific user interface for managing the service corresponding to the selected service object, and locating and binding the corresponding service to the service-specific administrative tool associated with the service specific user interface for enabling administrative of the corresponding service from the service specific user interface; and
    mean for the service-specific administrative tool, which is in communication with the generalized tool, and which is receiving the information representative of the network service to use the information representative of the network service to administer the service.

2. The administrative tool according to claim 1, further comprising an interface usable to pass at least some of the information contained in the service object from the generalized tool to the service-specific administrative tool.

3. The administrative tool according to claim 2, wherein the generalized tool queries the service object to determine whether it supports the interface, and user the ability of the object to support the interface to determine the ability of the service to be managed by the service-specific administrative tool.

4. The administrative tool according to claim 1, wherein the computer network is a local area network.

5. The administrative tool according to claim 1, wherein the computer network is a wide area network.

6. For use in a computer network, a method for invoking a service-specific administrative tool adapted for administering a computer network service installed on a network computer, the method comprising;
    providing a directory service user interface for querying one or more network services from one or more network directories, the directory service user interface providing options for querying network services registered with the one or more network directories by at least one of a service keyword or a service class;

querying for a particular one or more of the registered network services using the directory service and user input received at the directory service user interface comprising at least one of said service keyword or service class;

upon querying, providing a list of one or more selectable service objects corresponding to one or more network services that are identified during the query and that corresponding to the at least one of said service keyword or service class, wherein each of the selectable object is also associated with information representative of each corresponding service, wherein the information identifies each corresponding network service by one or more characteristics and is selected from group consisting of the name, type, location, and description of the network service, and information usable to locate a service-specific administrative tool, the information also including a binding information property which is used for identifying at least the location of the network service; and in response to the user selection selecting one of the service objects from the list, launching a service specific user interface for managing the service corresponding to the selected service object, and locating and binding the corresponding service to the service-specific administrative tool associated with the service specific user interface for enabling administrative of the corresponding service from the service specific user interface.

7. A method as recited in claim 6, wherein options for querying by at least one of said service keyword or service class are provided to a user by the directory service user interface only after a specific directory to be queried has first been identified, and such that the one or more directories queried by the directory service comprises the identified directory service.

8. A method as recited in claim 7, wherein the directory service is queried for the particular service in response to input comprising both a service keyword and service class.

9. A method as recited in claim 7, wherein the directory service is queried for the particular service in response to input other than a service name.

10. The method according to claim 6, further comprising: indirectly administering the corresponding service using a generalized management program.

11. The method according to claim 10, further comprising:
causing the generalized management program to invoke an interface program usable to pass at least some of the information contained in the object corresponding to the service from the generalized management program to the service-specific administrative tool.

12. The method of claim 6, further comprising:
querying the object corresponding to the service to determine whether the object supports the interface program; and
using the object's ability to support the interface program to determine the ability of the corresponding service to be managed by the service-specific administrative tool.

13. The method of claim 6, wherein the computer network is a local area network.

14. The method of claim 6, wherein the computer network is a wide area network.

15. A computer program product for use in a computer network, the computer program product comprising one or more computer-readable media having computer-executable instructions for implementing a method for invoking a service-specific administrative tool adapted for administering a computer network service installed on a network computer, the method comprising: providing a directory service user interface for querying one or more network services from one or more network directories, the directory service user interface providing options for querying network services registered with the one or more network directories by at least one of a service keyword or a service class;

querying for a particular one or more of the registered network services using the directory service and user input received at the directory service user interface comprising at least one of said service keyword or service class;

upon querying, providing a list of one or more selectable service objects corresponding to one or more network services that are identified during the query and that corresponding to the at least one of said service keyword or service class, wherein each of the selectable object is also associated with information representative of each corresponding service, wherein the information identifies each corresponding network service by one or more characteristics and is selected from group consisting of the name, type, location, and description of the network service, and information usable to locate a service-specific administrative tool, the information also including a binding information property which is used for identifying at least the location of the network service; and in response to the user selection selecting one of the service objects from the list, launching a service specific user interface for managing the service corresponding to the selected service object, and locating and binding the corresponding service to the service-specific administrative tool associated with the service specific user interface for enabling administrative of the corresponding service from the service specific user interface.

* * * * *